(12) United States Patent
Ubben

(10) Patent No.: US 11,058,198 B2
(45) Date of Patent: Jul. 13, 2021

(54) WHEELED LUGGAGE WITH SEAT

(71) Applicant: Event Horizon Services LLC, Dallas, TX (US)

(72) Inventor: John Theodore Ubben, Dallas, TX (US)

( * ) Notice: Subject to any disclaimer, the term of this patent is extended or adjusted under 35 U.S.C. 154(b) by 0 days.

(21) Appl. No.: 16/443,510

(22) Filed: Jun. 17, 2019

(65) Prior Publication Data

US 2020/0390209 A1    Dec. 17, 2020

(51) Int. Cl.
| | |
|---|---|
| *A45C 9/00* | (2006.01) |
| *B62B 3/02* | (2006.01) |
| *B62B 5/08* | (2006.01) |
| *A45C 5/03* | (2006.01) |
| *A45C 13/26* | (2006.01) |
| *A45C 13/28* | (2006.01) |
| *A45C 5/14* | (2006.01) |

(52) U.S. Cl.
CPC .............. *A45C 9/00* (2013.01); *A45C 5/03* (2013.01); *A45C 5/14* (2013.01); *A45C 13/262* (2013.01); *A45C 13/28* (2013.01); *B62B 3/02* (2013.01); *B62B 5/082* (2013.01); *A45C 2009/002* (2013.01); *A45C 2013/267* (2013.01)

(58) Field of Classification Search
CPC .... A45C 9/00; A45C 5/14; A45C 5/03; A45C 7/00
See application file for complete search history.

(56) References Cited

U.S. PATENT DOCUMENTS

| | | | | |
|---|---|---|---|---|
| 5,100,198 A | * | 3/1992 | Baltzell | A47C 7/74 280/30 |
| 5,899,467 A | * | 5/1999 | Henkel | A45C 5/14 190/1 |
| 5,957,349 A | | 9/1999 | Krulik | |
| 6,105,508 A | * | 8/2000 | Ryburg | A45C 7/00 108/42 |
| 6,241,313 B1 | | 6/2001 | Lenz et al. | |
| 6,932,427 B2 | | 8/2005 | Tamura | |
| 7,793,970 B2 | * | 9/2010 | Fegler | A45C 5/14 280/643 |
| 7,987,955 B2 | * | 8/2011 | Puchalski | A45C 5/14 190/10 |
| 8,146,722 B1 | * | 4/2012 | Moreno | A45C 5/14 190/115 |
| 8,607,945 B2 | * | 12/2013 | Kawalit | A45C 5/14 190/115 |
| 8,919,508 B1 | * | 12/2014 | Halko | A45C 9/00 108/42 |
| 9,446,849 B1 | * | 9/2016 | Pinkal | B64D 11/064 |
| 2004/0021353 A1 | | 2/2004 | Lozano et al. | |
| 2005/0098402 A1 | * | 5/2005 | Cohen | A45C 9/00 190/12 A |
| 2009/0289480 A1 | | 11/2009 | McFarland et al. | |

* cited by examiner

*Primary Examiner* — Hau V Phan

(57) ABSTRACT

Wheeled luggage with a seat is disclosed. In one embodiment, a seat base is secured to the upper surface of the suitcase and offset from a collapsible tote handle. A slot extends through the central base of the seat base and is configured to accommodate a handle secured to the suitcase. A pair of handholds are offset from the seat base at the front and rear with an open span between the pair of handholds. The seat base permits a user, such as a child, to straddle the wheeled luggage with legs astride of the suitcase to scoot along a surface.

10 Claims, 2 Drawing Sheets

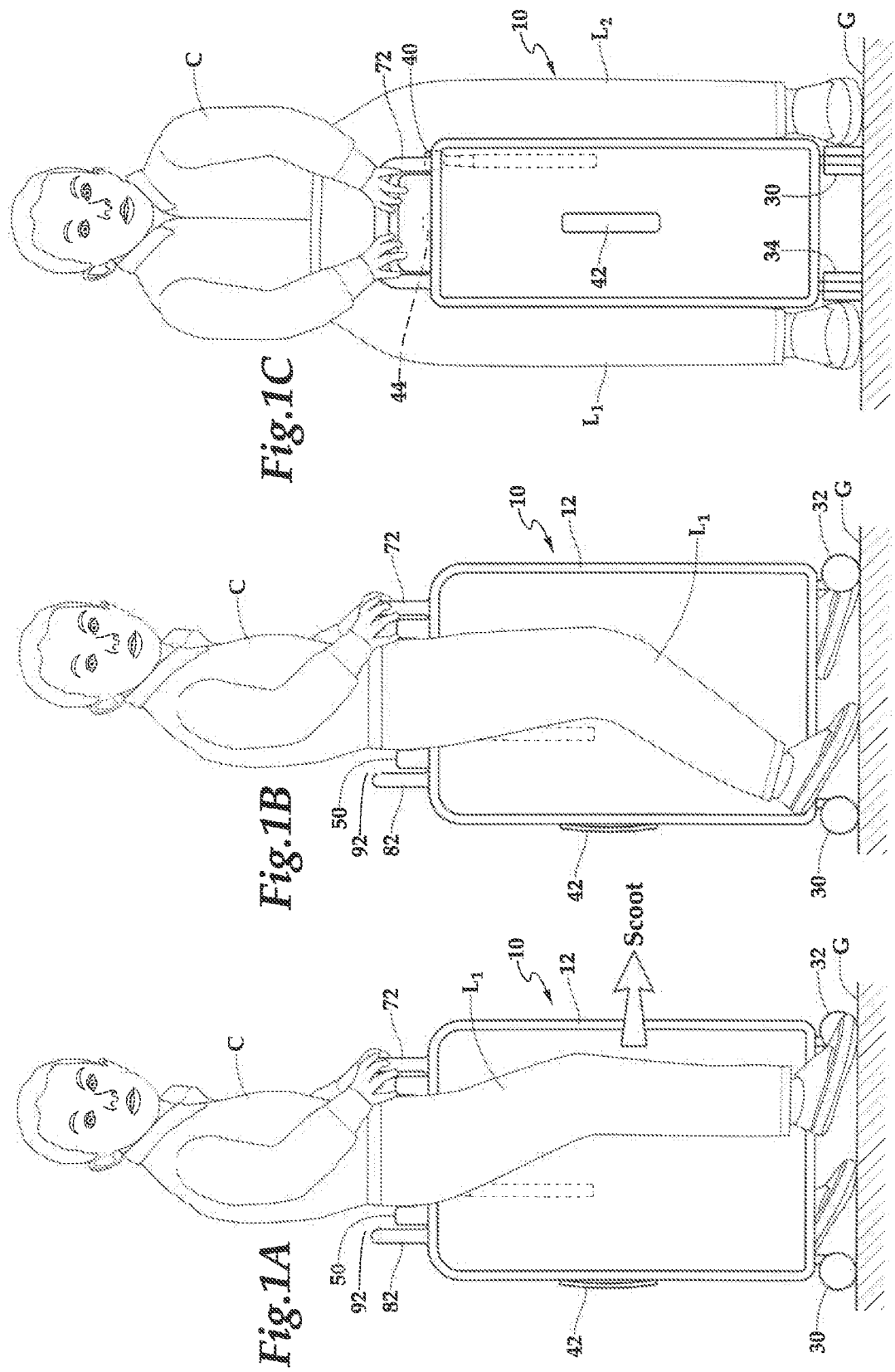

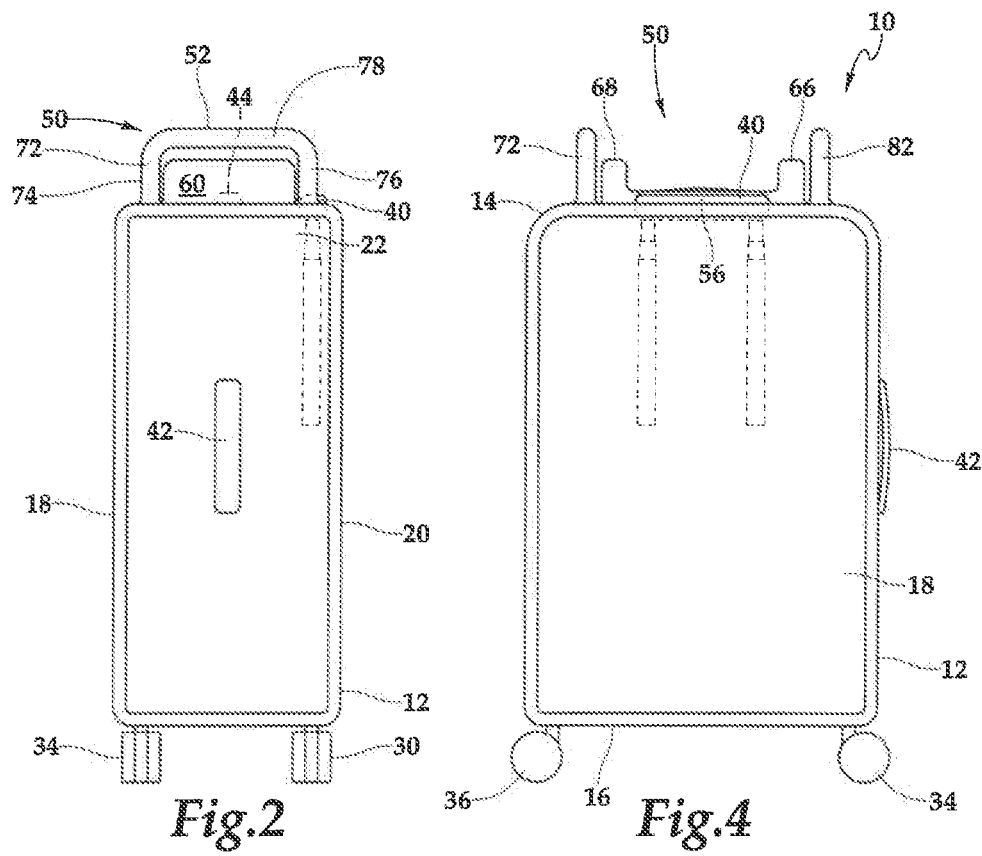
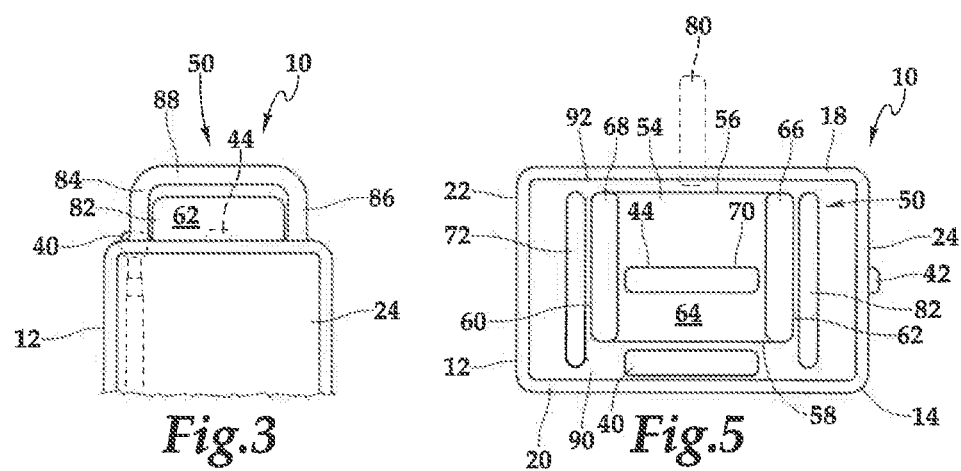

WHEELED LUGGAGE WITH SEAT

TECHNICAL FIELD OF THE INVENTION

This invention relates, in general, to luggage, and, in particular, to wheeled luggage, such as hand or carry-on luggage that can be taken on board the aircraft by a passenger, with a seat for accommodating a small child.

BACKGROUND OF THE INVENTION

As many people know, getting around an airport, railway station, or other transit hub, with a small child can be an extremely problematical operation. It is even more problematical with luggage, even wheeled luggage or small wheeled luggage such as hand or carry-on luggage that can be taken on board an aircraft or train. Improvements in wheeled luggage are needed.

SUMMARY OF THE INVENTION

It would be advantageous to achieve a wheeled luggage product that would improve upon existing limitations in functionality with respect to child seating. It would also be desirable to enable a mechanical and materials science-based solution that would provide enhanced performance and improved usability. To better address one or more of these concerns, wheeled luggage with a seat is disclosed. In one embodiment, a seat base is secured to the upper surface of the suitcase and offset from a collapsible tote handle. A slot extends through the central base of the seat base and is configured to accommodate a handle secured to the suitcase. A pair of handholds are offset from the seat base at the front and rear with an open span between the pair of handholds. The seat base permits a user, such as a child, to straddle the wheeled luggage with legs astride of the suitcase to scoot along a surface. These and other aspects of the invention will be apparent from and elucidated with reference to the embodiments described hereinafter.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which:

FIG. 1A is a side elevation view illustrating one embodiment of wheeled luggage being utilized by a child according to the teachings presented herein;

FIG. 1B is a side elevation view illustrating the wheeled luggage depicted in FIG. 1A being utilized by the child to scoot;

FIG. 1C is a front elevation view illustrating the wheeled luggage depicted in FIG. 1A being utilized by the child to scoot;

FIG. 2 is a front elevation view illustrating one embodiment of wheeled luggage according to the teachings presented herein;

FIG. 3 is a rear elevation view of only an upper portion of the wheeled luggage depicted in FIG. 1;

FIG. 4 is a side elevation view of the wheeled luggage depicted in FIG. 1; and

FIG. 5 is a top plan view of the wheeled luggage depicted in FIG. 1.

DETAILED DESCRIPTION OF THE INVENTION

While the making and using of various embodiments of the present invention are discussed in detail below, it should be appreciated that the present invention provides many applicable inventive concepts, which can be embodied in a wide variety of specific contexts. The specific embodiments discussed herein are merely illustrative of specific ways to make and use the invention and do not delimit the scope of the present invention.

Referring initially to FIG. 1A, FIG. 1B, FIG. 1C, FIG. 2, FIG. 3, FIG. 4, and FIG. 5 therein is depicted one embodiment of wheeled luggage, which is schematically illustrated and designated 10. The wheeled luggage 10 may include a suitcase 12 having an upper end 14 and a lower end 16 as well as a front 18, a rear 20, and sides 22, 24. Wheels 30, 32, 34, 36 extend from the lower end 16 of the suitcase 12. An extendable tote handle 40 is movable along the rear 20 of the suitcase 12. A handle 42 extends from the side 22 and a handle 44 extends from the upper end 14. It should be appreciated that although a particular design of suitcase 12 is illustrated and described, other types of suitcases are within the teachings presented herein.

As part of the wheeled luggage 10, a seat 50 for a child C, such as the illustrated small child, is shown integrated into the suitcase 12. The seat 50 comprises a frame structure 52 which defines the general overall configuration of the seat 50 for a child. Specifically, in some embodiments, the seat 50 may include a seat base 54 secured to the upper end 14 of the suitcase 12. As shown, the seat base 54 includes a side 56, a side 58, a front 60, and a rear 62. The seat base 54 may include a central base 64 with an upwardly extending tab 66 at the front 60 and an upwardly extending tab 68 at the rear 62. The upwardly extending tabs 66, 68 provide forward and rear support for the seated child C. In one embodiment, each of the upwardly extending tabs 66, 68 may include a contoured profile to enhance comfort.

The side 58 of the seat base 54 is offset from the extendable tote handle 40, which in one operational embodiment is collapsed. A slot 70 extends through the central base 64 of the seat base 54 and the slot 70 is configured to accommodate the handle 44 secured to the suitcase 12. A handhold 72 is forwardly offset from the seat base 54 along the front 60. In one embodiment, the handhold 72 includes a pair of risers 74, 76 supporting a handlebar 78 therebetween. In one implementation, the handhold 72 includes a flexible luggage handle pull 80. Similarly, a handhold 82 is laterally offset from the seat base 54 along the rear 62. The handhold 82 includes a pair of risers 84, 86 supporting a handlebar 88 therebetween. In one implementation, the handhold 72 includes a flexible luggage handle pull 80. Lateral open spans 90, 92 are positioned between the handholds 72, 82. In one implementation, one or more straps may extend from the sides 56, 58, front 60, or rear 62 of the seat base 54 or be secured to the suitcase 12 proximate the sides 56, 58, front 60, or rear 62 of the seat base 54. This embodiment is depicted in FIG. 4.

In operation, as discussed, the wheeled luggage 10 includes the suitcase 12 having wheels 30, 32, 34, 36 and the extendable tote handle 40 extending therefrom for transporting the suitcase 12 along a floor surface, such as ground G, for example. The seat 50 includes the seat base 54, handholds 72, 82 to provide an area to receive the child C. The wheeled luggage 10 can be taken on board the aircraft by a passenger and, in use in the airport or other facility, the seat 50 accommodates the child C. In particular, the seat base 54 in combination with the open span 92 and the open span 92 provides a straddle seating arrangement with legs L1, L2 astride of the suitcase 12 via the lateral open span 90 and the lateral open span 92. This straddle seating arrangement permits the child C to scoot across the ground G.

The order of execution or performance of the methods and techniques illustrated and described herein is not essential, unless otherwise specified. That is, elements of the methods and techniques may be performed in any order, unless otherwise specified, and that the methods may include more or less elements than those disclosed herein. For example, it is contemplated that executing or performing a particular element before, contemporaneously with, or after another element are all possible sequences of execution.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A wheeled luggage including a suitcase having wheels and a collapsible tote handle extending therefrom for transporting the suitcase along a floor surface, the wheeled luggage comprising:
   a seat base secured to an upper surface of the suitcase, the seat base having a front, a rear, a first side, and a second side;
   the seat base including a central base with a first upwardly extending tab at the front and a second upwardly extending tab at the rear;
   the first side of the seat base laterally offset from the collapsible tote handle, the collapsible tote handle being in a collapsed position;
   a slot extending through the central base of the seat base, the slot configured to accommodate a handle secured to the suitcase;
   a first handhold forwardly offset from the seat base along the front;
   a second handhold rearwardly offset from the seat base along the rear;
   a first lateral open span between the first handhold and the second handhold, the first lateral open span being proximate to the first side of the seat base;
   a second lateral open span between the first handhold and the second handhold, the second lateral open span being proximate to the second side of the seat base; and
   the seat base in combination with the first lateral open span and the second lateral open span providing a straddle seating arrangement via the first lateral open span and the second lateral open span.

2. The wheeled luggage as recited in claim 1, wherein the first upwardly extending tab and the second upwardly extending tab each further comprise a contoured profile.

3. The wheeled luggage as recited in claim 1, further comprising a strap extending from the seat base.

4. The wheeled luggage as recited in claim 1, further comprising at least one strap secured to the suitcase proximate the seat base, the strap including a flexible luggage handle pull.

5. A wheeled luggage including a suitcase having wheels and a collapsible tote handle extending therefrom for transporting the suitcase along a floor surface, the wheeled luggage comprising:
   a seat base secured to an upper surface of the suitcase, the seat base having a front, a rear, a first side, and a second side;
   the seat base including a central base with a first upwardly extending tab at the front and a second upwardly extending tab at the rear;
   the first side of the seat base laterally offset from the collapsible tote handle, the collapsible tote handle being in a collapsed position;
   a slot extending through the central base of the seat base, the slot configured to accommodate a handle secured to the suitcase;
   a first handhold forwardly offset from the seat base along the front, the first handhold including a flexible luggage handle pull;
   a second handhold rearwardly offset from the seat base along the rear, the second handhold including a flexible luggage handle pull;
   a first lateral open span between the first handhold and the second handhold, the first lateral open span being proximate to the first side of the seat base;
   a second lateral open span between the first handhold and the second handhold, the second lateral open span being proximate to the second side of the seat base; and
   the seat base in combination with the first lateral open span and the second lateral open span providing a straddle seating arrangement via the first lateral open span and the second lateral open span.

6. The wheeled luggage as recited in claim 5, wherein the first upwardly extending tab and the second upwardly extending tab each further comprise a contoured profile.

7. The wheeled luggage as recited in claim 5, further comprising a strap extending from the front of the seat base.

8. The wheeled luggage as recited in claim 5, further comprising at least one strap secured to the suitcase proximate the front of the seat base, the strap including a flexible luggage handle pull.

9. A wheeled luggage including a suitcase having wheels and a collapsible tote handle extending therefrom for transporting the suitcase along a floor surface, the wheeled luggage comprising:
   a seat base secured to an upper surface of the suitcase, the seat base having a front, a rear, a first side, and a second side, the seat including a flexible material;
   the seat base including a central base with a first upwardly extending tab at the front and a second upwardly extending tab at the rear;
   the first side of the seat base laterally offset from the collapsible tote handle, the collapsible tote handle being in a collapsed position;
   a slot extending through the central base of the seat base, the slot configured to accommodate a handle secured to the suitcase;
   a first handhold forwardly offset from the seat base along the front, the first handhold including a flexible luggage handle pull;
   a second handhold rearwardly offset from the seat base along the rear, the second handhold including a flexible luggage handle pull;
   a first lateral open span between the first handhold and the second handhold, the first lateral open span being proximate to the first side of the seat base;
   a second lateral open span between the first handhold and the second handhold, the second lateral open span being proximate to the second side of the seat base; and
   the seat base in combination with the first lateral open span and the second lateral open span providing a straddle seating arrangement via the first lateral open span and the second lateral open span.

10. The wheeled luggage as recited in claim 9, wherein the first upwardly extending tab and the second upwardly extending tab each further comprise a contoured profile.

\* \* \* \* \*